United States Patent [19]
Farque

[11] 3,976,151
[45] Aug. 24, 1976

[54] SELF-PROPELLED GOLF CART
[75] Inventor: Clade Anthony Farque, Fayetteville, Ark.
[73] Assignee: Citation Manufacturing Company, Inc., Siloam Springs, Ark.
[22] Filed: Apr. 17, 1974
[21] Appl. No.: 461,809

Related U.S. Application Data
[62] Division of Ser. No. 166,051, July 26, 1971, Pat. No. 3,812,929.

[52] U.S. Cl. .................................. 180/6.5; 180/98; 318/581; 343/119; 343/711; 343/788
[51] Int. Cl.² ........................................ B62D 11/02
[58] Field of Search ............ 180/98, 6.5; 343/7 VM, 343/119, 711, 788; 179/82; 318/581

[56] References Cited
UNITED STATES PATENTS
| | | | |
|---|---|---|---|
| 3,147,817 | 9/1964 | Liban | 180/98 |
| 3,669,208 | 6/1972 | Brooke | 180/98 |
| 3,720,281 | 3/1973 | Frownfelter | 180/98 |

*Primary Examiner*—Maynard R. Wilbur
*Assistant Examiner*—Richard E. Berger
*Attorney, Agent, or Firm*—Clarence A. O'Brien; Harvey B. Jacobson

[57] ABSTRACT

A self-propelled, battery powered vehicle adapted to carry golf clubs and the like and including means to automatically follow a golfer carrying a small transmitter as he walks about a golf course. The transmitter generates a signal pattern which magnetically couples the transmitter to a directional antenna system carried by the vehicle. An automatic guidance system in the vehicle provides signals which control the individual speeds of right and left wheel drive motors to affect steering and vehicle speed in response to the position and movement of the golfer's transmitter. The vehicle may be provided with a collapsible control arm which permits manual steering of the vehicle in lieu of the transmitter control.

20 Claims, 18 Drawing Figures

SELF-PROPELLED GOLF CART

This is a division, of application Ser. No. 166,051, filed July 26, 1971 now U.S. Pat. No. 3,812,929, issued May 28, 1974.

BACKGROUND OF THE INVENTION

The present invention is generally related to self-propelled vehicles, and, more particularly, to battery powered, electric motor driven vehicles for golf course use.

In the past many battery powered vehicles have been provided to transport players and their equipment about golf courses. Such vehicles, in many cases, have become a source of serious accidents due to driver inattentiveness or the vehicle's inability to safely negotiate the golf course terrain. The number of accidents has reached a level where many insurance companies refuse to insure such vehicles, owners or operators. Furthermore, these vehicles have become an object of criticism of many golfers who claim that they detract from the sport of the golf game. Also, such vehicles often damage the golf course turf due to their heavy concentration of weight. A most apparent disadvantage of such vehicles is that they are highly inefficient and require constant attention and battery recharging.

The many disadvantages of these conventional golf cart vehicles make it especially desirable to provide a vehicle which will automatically transport the golfer's bag and clubs, yet permit the golfer to walk about the course with a minimum amount of attention to the vehicle's operation. Ideally, such a vehicle would be self-propelled and have its own guidance system for following the player. Also, it is desirable that such a vehicle have means for automatically stopping within a reasonably close distance behind the golfer or outside of a predetermined remote distance.

Such a vehicle must be provided with a reliable, highly directional and distance related guidance system. Such a system would include an efficient means for steering and propelling the vehicle on a path which follows the player as he walks about the course. Other requirements would include efficient battery operation, selective manual control, reliability under environmental extremes, and relatively light weight construction.

It is, therefore, an object of the present invention to provide a unique self-propelled caddying vehicle with a guidance system which homes in on a small transmitter carried by a golfer.

A further object of the present invention is to provide a novel magnetic coupling system which is highly directional to nature and capable of providing guidance signals over relatively short distances.

It is still another object of the present invention to provide a versatile magnetic antenna system which may be mounted on a vehicle to sense the location and distance of a magnetic signal generating transmitter, the antenna system being capable of providing steering and speed signals to a vehicle for following the transmitter.

Yet, another object of the present invention is to provide a unique steering and drive mechanism for self-propelled vehicles which is highly reliable and extremely efficient in nature and which is capable of moving the vehicle along a desired path within a predetermined speed range, regardless of changes in terrain inclination.

It is also another object of the present invention to provide a novel guidance system including a circuit which is extremely compact, rugged and light weight and which is responsive to both transmitter location and drive motor utilization to provide automatic vehicle control for driving and braking a vehicle at all times during which the system is in operation.

Still another object of the present invention is to provide a self-propelled automatic caddying vehicle with an alternate manual control system which overrides the vehicle's antenna guidance system and which may be selectively actuated by the golfer through a handle mechanism to accurately drive the vehicle directly behind a golfer when it is necessary to negotiate bridges or similar golf course obstructions.

SUMMARY OF THE INVENTION

In carrying out the above-mentioned objects, an alternating magnetic field is generated by a transmitter carried by the golfer in order to establish an operating zone within which automatic control is exercised over the movement of a golf cart vehicle in response to movement of a golfer carrying the transmitter. Three receiving antennas mounted on the vehicle develop signal voltages which are approximately inverse functions of the distance between the transmitter and the respective receiving antennas. The signal voltages developed at two of the antennas are converted into speed controlling and turning signals by means of summing and differential amplifiers. The speed controlling signal is operative through a signal range control means to develop stop signals for decelerating and stopping the movement of the vehicle in order to establish limits of a zone behond which the vehicle is held completely stationary. The limits of this zone are further modified by an adjusted signal voltage obtained from the third of the signal receiving antennas in order to avoid ambiguous signals from the other two antennas under certain spacial relationships between the vehicle and the transmitter.

The speed controlling, turning and stop signals are operative through servo controls to vary the speed of a pair of drive motors through which both propulsion and steering of the vehicle is affected. The servo control means also operates the drive motors in accordance with desired motion characteristics, while vehicle motion sensing devices monitoring varying vehicle movement compensate for load variations in order to maintain the desired motion characteristics. Thus, the drive motors are operative simultaneously to propel the vehicle and differentially to effect steering and also act as generators for dynamic braking purposes. In addition, static brakes are also associated with the drive motors to hold the vehicle stationary when both motors are deenergized.

BRIEF DESCRIPTION OF THE FIGURES

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2, 12, 13:
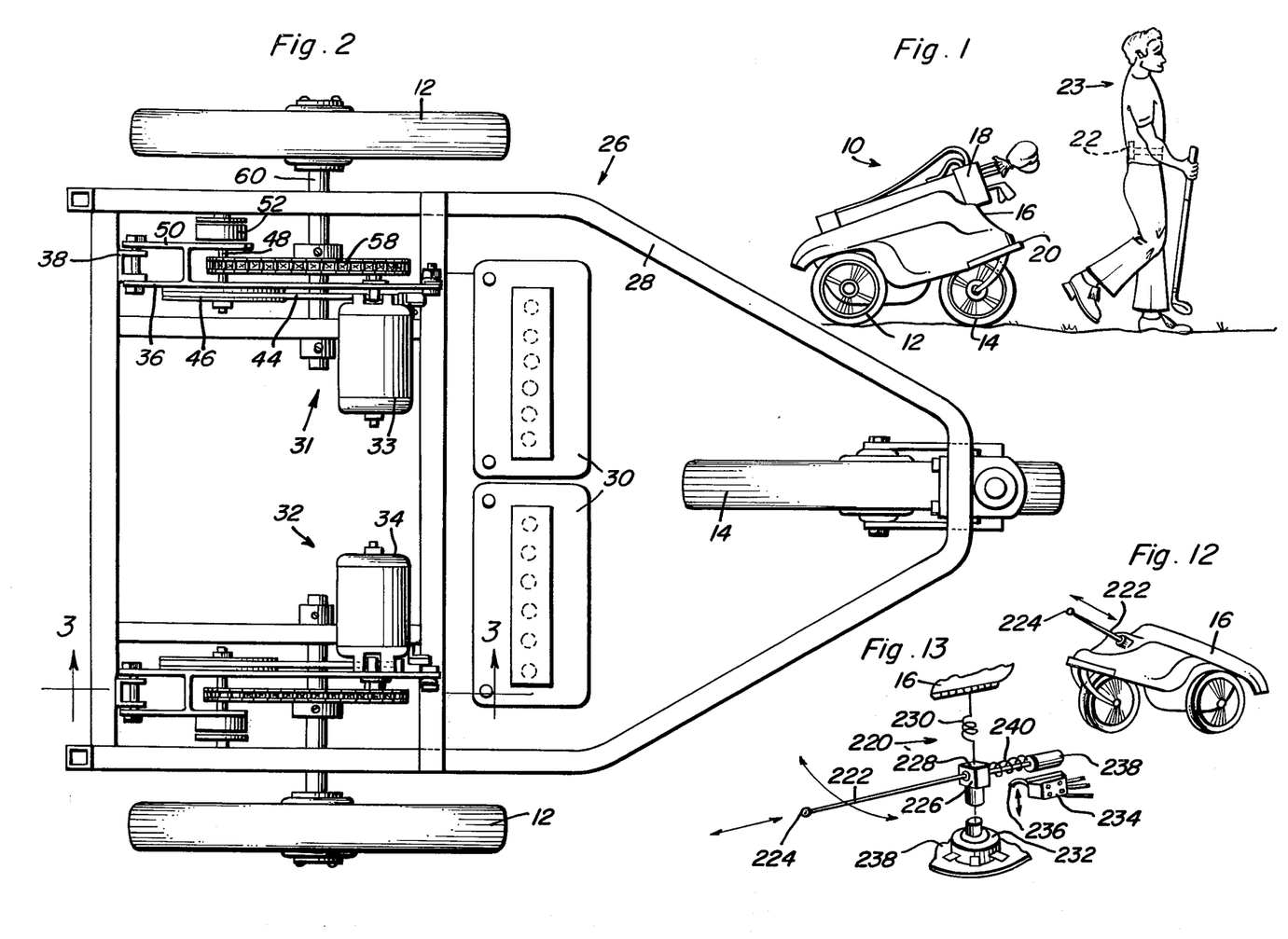
FIG. 1 is a side elevational view illustrating a golf cart vehicle constructed in accordance with the present invention following a golfer carrying a transmitter associated with the system of the present invention.
FIG. 2 is a plan view of a golf cart vehicle framework and drive mechanism associated with the present invention.
FIG. 12 is a perspective view of the golf cart of the present invention with manual control handle in the extended position.
FIG. 13 is a simplified perspective view of the manual control handle mechanism associated with the present invention.

Referring, now, more particularly to FIG. 1, the self-propelled golf cart vehicle of the present invention is generally indicated by the numeral 10 and includes a pair of rear drive wheels 12 and a single forward caster wheel 14 which is angularly displaceable about a substantially vertical axis in order to accommodate turning or steering of the vehicle. The vehicle is provided with a suitable body 16 of molded plastic, fiberglass, or the like which is shaped to accommodate a conventional golf bag 18. The front or leading edge of the vehicle body may be provided with a collision responsive switch 20, preferably of the conventional tape switch type.

In accordance with the present invention, the vehicle is self-propelled for automatic movement under the command of a transmitter 22 carried by a golfer 23, as illustrated in FIG. 1. When the transmitter is switched to the "on" position by the golfer, the vehicle will follow the golfer's movements about the golf course. Movement of the vehicle, however, is limited to a predetermined zone spaced from the transmitter 22 by a minimum separation distance so that the vehicle will stop a few feet from the golfer in order to avoid possible collision or interference with the golf game.

Servo systems for controlling the movement and guidance of vehicles are well known, such systems employing a first motor for propulsion, a second motor for steering, and separate means for braking. Aside from the mechanical complexity, such a conventional system has several fundamental limitations which preclude its use in a caddying vehicle. Steering with a motor which positions a wheel or wheels of the vehicle requires a compromise between the rate with which the steering is accomplished and the stability of the steering. As such, stability and rapidity of steering are inversely related.

A common means which may be used to cope with this problem is the introduction of an insensitive region, or dead band, into the steering system to prevent turning unless the steering requirements exceed a predetermined value. Such a system, however, would require that a golfer carrying the transmitter make at least a minimum angular change with respect to the trailing vehicle before a steering response would be initiated. Any static error in such a steering system would accumulate until it exceeded the dead band threshhold to cause a steering correction. Such an arrangement results in a tacking or hunting motion of the vehicle even if the golfer were moving in a straight line. It is apparent that such a steering system in a battery powered vehicle is highly inefficient since it does not aid in propelling the vehicle, yet consumes a considerable amount of power to merely position the steering mechanism.

Generally such steering systems require the use of a differential in the drive wheel axle further reducing the efficiency of the over-all system. Furthermore, the differential prevents the drive wheel with the best traction from receiving the most torque, the maximum traction effort being limited to that developed by the wheel with the least traction.

Figures 3, 4, 9:
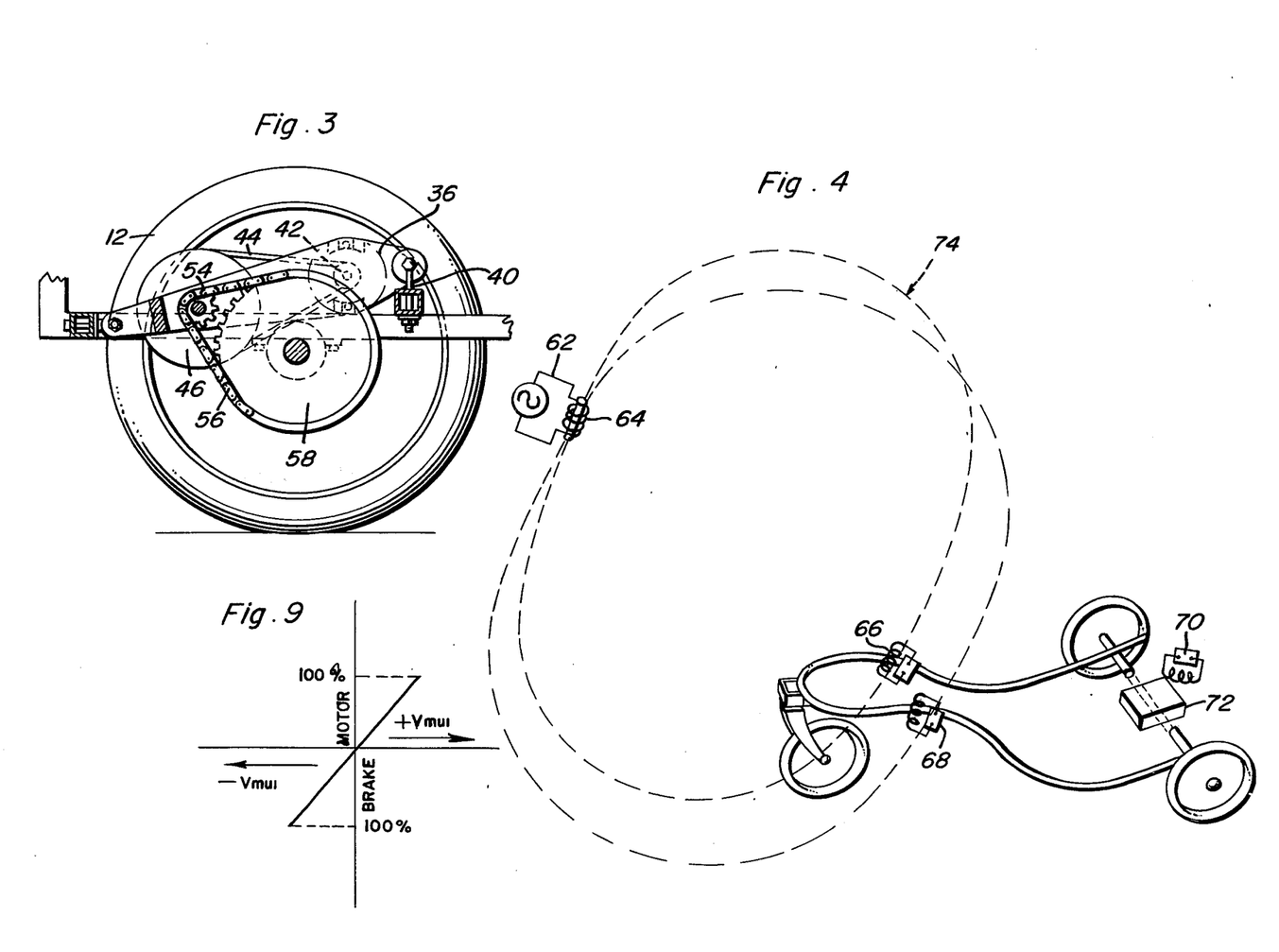
FIG. 3 is a sectional view of the drive mechanism taken along section 3—3 of FIG. 2.
FIG. 4 is a simplified perspective view of the vehicle antenna system magnetically coupled to the signal generating transmitter.
FIG. 9 is a graphical illustration of the motor utilization characteristic.

It is desirable, therefore, to provide a mechanical system for control of a vehicle in a relatively efficient and simple manner without the inherent compromises and limitations of conventional systems. Referring to FIGS. 2 and 3, such a mechanical drive is illustrated and is generally indicated by the numeral 26 and includes a tubular support frame 28, a pair of batteries 30 and a pair of independent drive mechanisms 31 and 32. The drive mechanisms are provided with electric drive motors 33 and 34 each mounted to an elongated support plate 36 pivotally mounted at one end to framework 28 by way of a flange 38. The opposite end of plate 36 is connected to framework 28 by way of an adjustment stud 40 which is threadedly connected to framework 28 for vertical adjustment relative thereto. Thus, vertical adjustment of stud 40 provides pivotal adjustment of support plate 36. The output shaft of each motor is provided with a drive pulley 42 which advances a belt 44 to rotate a larger driven pulley 46. Each driven pulley 46 is rigidly affixed to an intermediate or jack shaft 48 supported at one end by plate 36 and at the opposite end by a support bracket 50 integral with support plate 36. A static brake assembly 52 is mounted to bracket 50 with jack shaft 48 extending therethrough to achieve desired braking, as hereinafter explained. A drive sprocket 54 is rigidly affixed to shaft 48 to advance a chain 56 for rotation of a driven sprocket 58 drivingly connected to a wheel axle 60 rotatably mounted on support framework 28. Proper adjustment of chain 56 is provided by adjustment stud 40. These chain drives act as efficient and rugged power transmission means between the intermediate or jack shafts 48 and the axles which rotate the wheels 12.

When the vehicle is travelling along a straight path, each wheel will travel the same distance along the ground and will be rotated at the same speed. The forward speed of the vehicle is controlled by varying the speeds of motors 33 and 34 in unison.

Steering is accomplished by differentially controlling the speeds of the electric motors. As the speed of one motor is increased by a given amount, the speed of the other motor is decreased by the same amount. This, of course, causes the respective wheels to travel unequal distances, forcing the vehicle to travel along a curved course. During such a steering or turning operation, the front wheel 14 is free to caster about as required and has no effect upon the steering of the vehicle. This steering arrangement is so effective that under extreme turning or steering conditions the inside or slow wheel may be completely stopped, and the vehicle will pivot about this wheel to accomplish a complete turn within an area which is only twice the width of the vehicle.

It will be appreciated that the above described dual drive system is highly efficient since all of the energy which is consumed in negotiating a turn is also used to propel the vehicle in a forward direction. The continuously rotating drive mechanisms provide essentially lossless steering since all frictional losses must be overcome by the motors in bringing the vehicle up to speed. Differential speed control does not change the total power delivered to the motors for a given forward speed. The lossless nature of the steering operationally yields immediate response to any change in position between the golfer and vehicle, however slight.

It will also be appreciated that the dual drive servo system is such that the steering rate is dependent upon the differential acceleration and deceleration of the drive mechanisms, rather than the positioning of the front wheel by use of a motor and gear box. Such differential steering is many times faster and more responsive than front wheel steering. Of course, such a system does not require the use of a differential in the wheel drive axle, thus, permitting the torque supplied to each drive wheel to be independent of the other. Also, the elimination of the differential results in increased efficiency, and reduced manufacturing costs.

In addition to powering and steering the vehicle, the dual drive system provides dynamic braking by which the speed of the vehicle is controlled while descending down sloped terrain. Whenever the motors 33 and 34 are not in use for propulsion, they act as generators which can be electrically loaded in unison to retard forward motion of the vehicle and loaded differentially to yield steering. The dual drive retains the same control characteristics whether used for propulsion or braking, the only significant difference being that the motor torques are reversed. The dual drive system is effective only when the vehicle is in motion, and, therefore, mechanical brakes 52 are utilized for parking purposes. The mechanical brakes are actuated electrically whenever the vehicle is at rest and serve only to lock jack shafts 48 and play no role in steering or speed control.

Referring to FIG. 4, it will be appreciated that an electronic control system is provided for the vehicle and includes a transmitter 62 with transmitting antenna 64 which which generates a signal to be received by receiving antennas 66, 68, and 70. The signals from receiving antennas are fed into an electronic package 72 also mounted in the vehicle. This system is adapted to sense the position and movement of the transmitter as it is carried by a golfer and controls the functioning of the dual drive mechanism to yield the appropriate vehicle response.

The physical phenomenon used to link the transmitter with the vehicle receiving antennas is a rapidly alternating magnetic flux, generally indicated by the numeral 74. The transmitter generates an omnidirectional magnetic flux field about its vertical axis, such that a change in position of the transmitter products a corresponding change in the magnetic flux field. Only those flux components which are of interest are shown in FIG. 4 for the sake of clarity. In essence, the transmitter and receiver antennas comprise a loosely coupled transformer with a large and variable air gap. This is contrary to normal transmitter technique, in which the transmitted magnetic flux does not couple through the transmitter and receiving antennas to form a closed magnetic path.

Figure 6A:
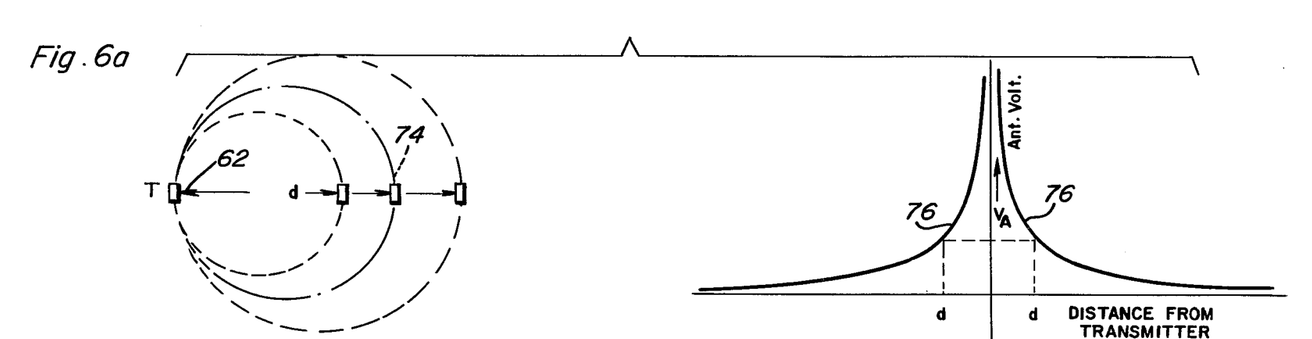
FIGS. 6a, 6b, and 6c are diagrammatic and graphical illustrations showing the relationship between the receiving antenna signal voltages as a function of transmitter location.
Figure 6B:
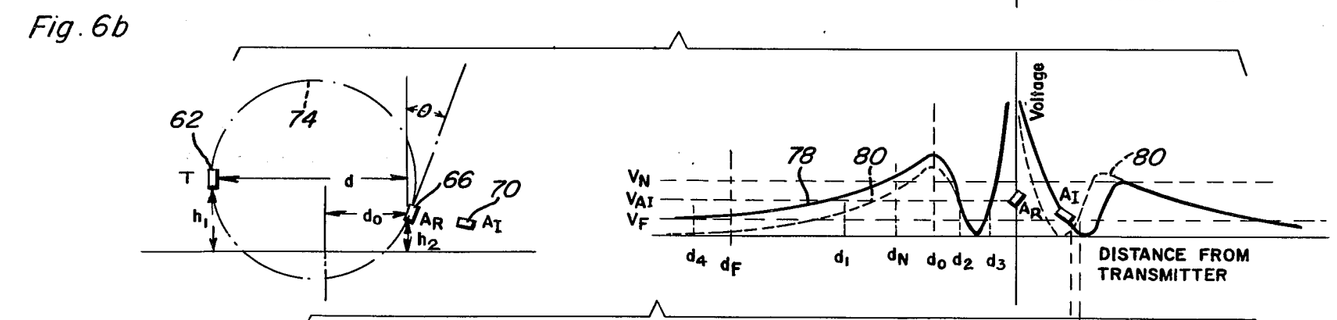
Figure 6C:
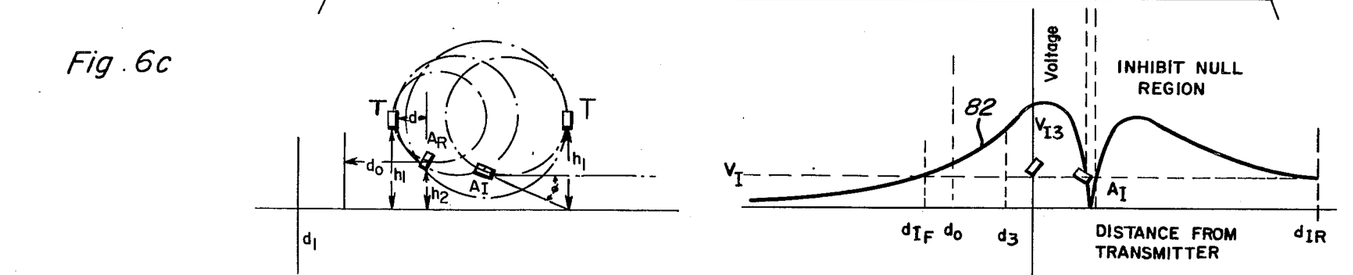

The importance of the geometrical relationship of the receiving antennas to one another, to the ground and to the transmitter cannot be overemphasized. This relationship is crucial to the proper operation of the vehicle. Referring to FIGS. 6a, 6b, and 6c, the importance of the geometrical relationship will be more fully appreciated. FIG. 6a represents a special case in which the transmitter 62 and a receiving antenna are mounted in the same plane and have parallel flux generating and receiving axis. For such a case, the flux 74 from the transmitter to the receiving antenna varies only with the distance $d$ of separation. Each position of the receiving antenna has a corresponding flux density which generates a voltage proportional to the magnitude of the flux cutting the turns of the receiving antenna. Also, for any position d the coupling is optimum since the flux and the axes of the receiving antenna coil are aligned. A plot of the voltage generated by the antenna coil versus distance $d$ is plotted on the curve to the right side of FIG. 6a. This curve is roughly parabolic and symmetrical about the $y$ axis. Characteristic of this curve 76 is the fact that for each distance from the transmitter there is one and only one corresponding magnitude of voltage from the receiving antenna coil.

Due to the low profile of the golf caddying vehicle and the waist high transmitter location as it is carried by the golfer, it is not feasible to provide a coupling geometry wherein the transmitting and receiving antenna axes are parallel to each other, as shown in FIG. 6a. A more appropriate coupling geometry is illustrated in FIG. 6b, wherein $A_R$ corresponds to the right hand receiving antenna 66 and $A_I$ refers to the rear mounted inhibit antenna 70. The height $h_1$ is the elevation at which the transmitter 62 is carried above the ground, and $h_2$ is the fixed height of the receiving antenna above the ground as it is mounted in the vehicle. The change in geometry from that of FIG. 6a results in a much different coupling response for receiving antenna 66 as evidenced by curve 78 compared to curve 76. Of particular interest is the fact that for any voltage $V_{A1}$ induced in receiving antenna 66, there are three locations $d_1$, $d_2$, and $d_3$ from which the transmitter would induce an identical voltage. This ambiguity would result in spurious responses by the vehicle for the transmitter located at either $d_2$ or $d_3$. Distance $d_0$ is the minimum distance between the transmitter and the receiving antenna 66 that will not produce ambiguous coupling.

Another characteristic of response curve 78 is that it is not symmetrical about the $y$ axis, as was curve 76. This nonsymmetry is purposely introduced into the response of the receiving antenna 66 by rotating its axis from the vertical by angle $\theta$. This angular orientation of receiving antenna 66 yields a higher degree of coupling for large distances forward of the vehicle since the flux lines from the transmitter pass more nearly axially through the receiving antenna. If the single $\theta = 0$, the response curve would correspond to curve 80. By increasing θ, the coupling in front of the vehicle is increased, while that to the rear is decreased, yielding a greater control range for the transmitter to the front of the vehicle where it is most desirable.

To prevent ambiguous coupling of antennas 66 and 68 from causing undesirable responses, inhibit antenna 70 is suitably located to couple with the transmitter in a nonambiguous manner for any distance $d$ of the transmitter to the front or rear of the vehicle. The flux 74 from the transmitter at distance $d_3$, as shown in FIG. 6b, passes nearly radially through receiving antenna 66 to generate a voltage also corresponding to some larger distance $d_1$, hence the ambiguity. This same location of the transmitter results in some magnetic flux threading the inhibit antenna $A_I$ corresponding to antenna 70. as shown in FIG. 6c. Since the magnetic flux threads the inhibit antenna at a relatively small angle to its axis, it induces an appreciable voltage $V_{I3}$ as shown on curve 82. The characteristics of curve 82 are such that the response of the inhibit antenna at different distances $d$ from the transmitter is not symmetrical front to rear since the axis of the inhibit antenna is placed at an angle $\phi$ to the horizontal. This angle provides greater coupling to the rear of the vehicle than to the front.

It should be kept in mind that one function of the system is to control the start and stop responses of the vehicle as the location of the transmitter changes with movements of the golfer. The voltages in the receiving antennas 66 and 68 and the voltage induced in inhibit antenna 70 are sufficient to define a sensitivity pattern surrounding the vehicle and within which the vehicle will respond to the energized transmitter. This is more clearly illustrated in FIGS. 7a and 7b.

Figure 7A:
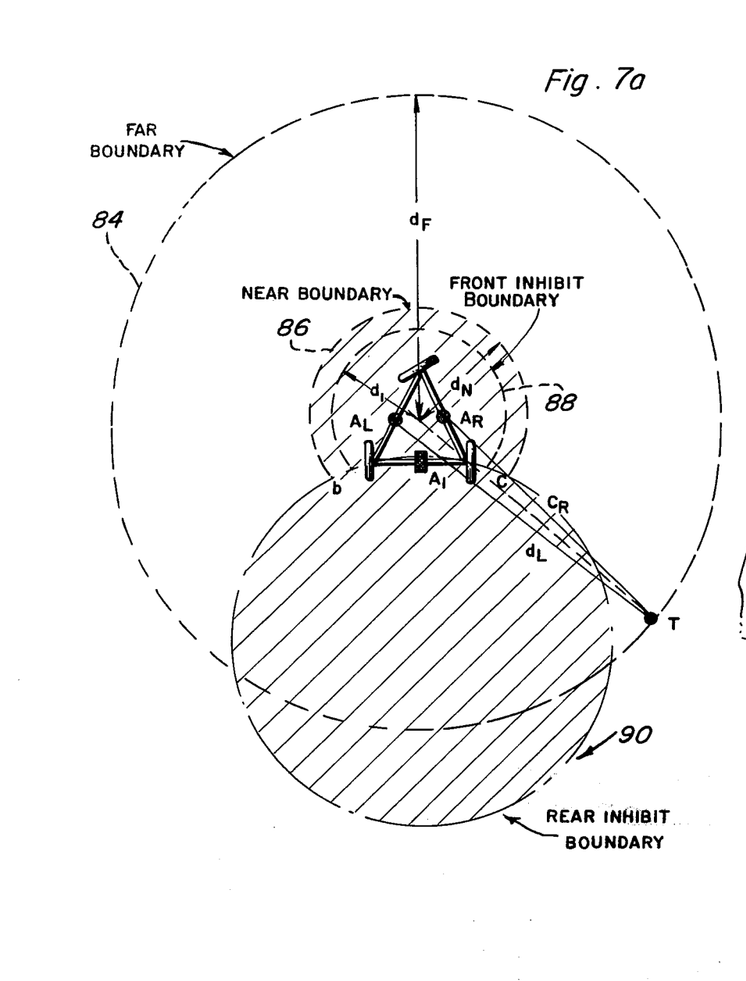
FIGS. 7a and 7b illustrate the approximate receiving antenna sensitivity pattern and the vehicle steering response to the transmitter located within the pattern.

Assuming that the vehicle is initially in the position shown in FIG. 7a, the maximum distance $d$ from which the transmitter will initiate control of the vehicle is that the distance $d_F$ at which a voltage $V_F$ is generated in each receiving antenna, as shown in the curve of FIG. 6b. The locus of the locations at which the receiving antenna experiences an induced voltage $V_F$ is a generally circular curve 84, hereafter referred to as the Far boundary. The angle $\theta$ of each receiving antenna determines the somewhat elliptical shape of the Far boundary 84. The minimum distance $d$ from which the transmitter will maintain control of the vehicle is a locus of the locations at which the receiving antennas experience an induced voltage $V_N$ and is a nearly circular curve 86, hereafter referred to as the Near boundary. Should the transmitter be carried within the Near boundary, the voltages in receiving antennas 66 and 68 would become ambiguous, as illustrated by the voltage curves of FIG. 6b. The inhibit antenna 70, however, provides an induced voltage $V_I$ at a distance $D_{IF}$ which is utilized to inhibit operation of the vehicle when the transmitter is closer than a distance $d_{IF}$. Thus, the locus of $d_{IF}$ about the front of the vehicle is indicated as the Front Inhibit boundary 88. To the rear of the vehicle, the inhibit antenna provides a somewhat circular area within which the transmitter is ineffective in advancing the vehicle. This area is generally indicated by the numeral 90 and is referred to as the Rear Inhibit boundary. Thus, it will be appreciated that the vehicle will only respond to the energized transmitter when it is within the Far boundary, yet outside of the Front and Rear Inhibit boundaries. As such, the sensitivity pattern for vehicle response corresponds to an area which is somewhat circular or elliptical with a FIG. 8 area removed therefrom, as indicated by the shaded area of FIG. 7a.

Figure 7B:
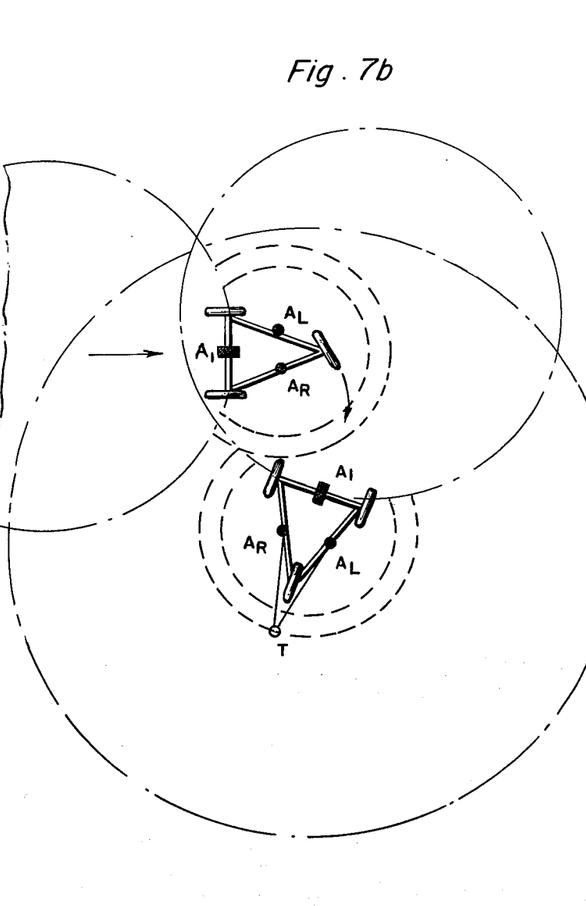

The over-all sensitivity pattern provided by the antenna geometry is such that the energized transmitter will cause the vehicle to start and to follow a golfer so long as he remains within the sensitivity pattern. Should the golfer move rapidly away from the vehicle such that he crosses the Far boundary, or should he move toward the vehicle and cross the Near or Front Inhibit boundaries, the vehicle will come to a stop. The control circuitry is such that once the golfer has crossed the Near boundary, the drive motors will not be energized until he walks back through the Front Inhibit Boundary and passes by the Near boundary. Assuming that the energized transmitter is located within the sensitivity pattern, as illustrated in FIG. 7b. As the vehicle advances, of course, the sensitivity pattern likewise advances over the ground and the vehicle continues to move until the Near boundary reaches the transmitter location, at which point the vehicle comes to a rapid halt.

Figure 5A:
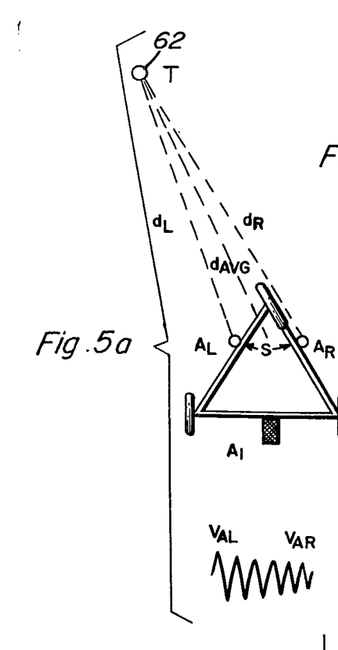
FIGS. 5a, 5b, and 5c are diagrammatic and graphical illustrations showing the relationship between the signal voltages of the receiving antennas and the relative positions of the transmitting and receiving antennas.
Figures 5B, 5C, 8, 10:
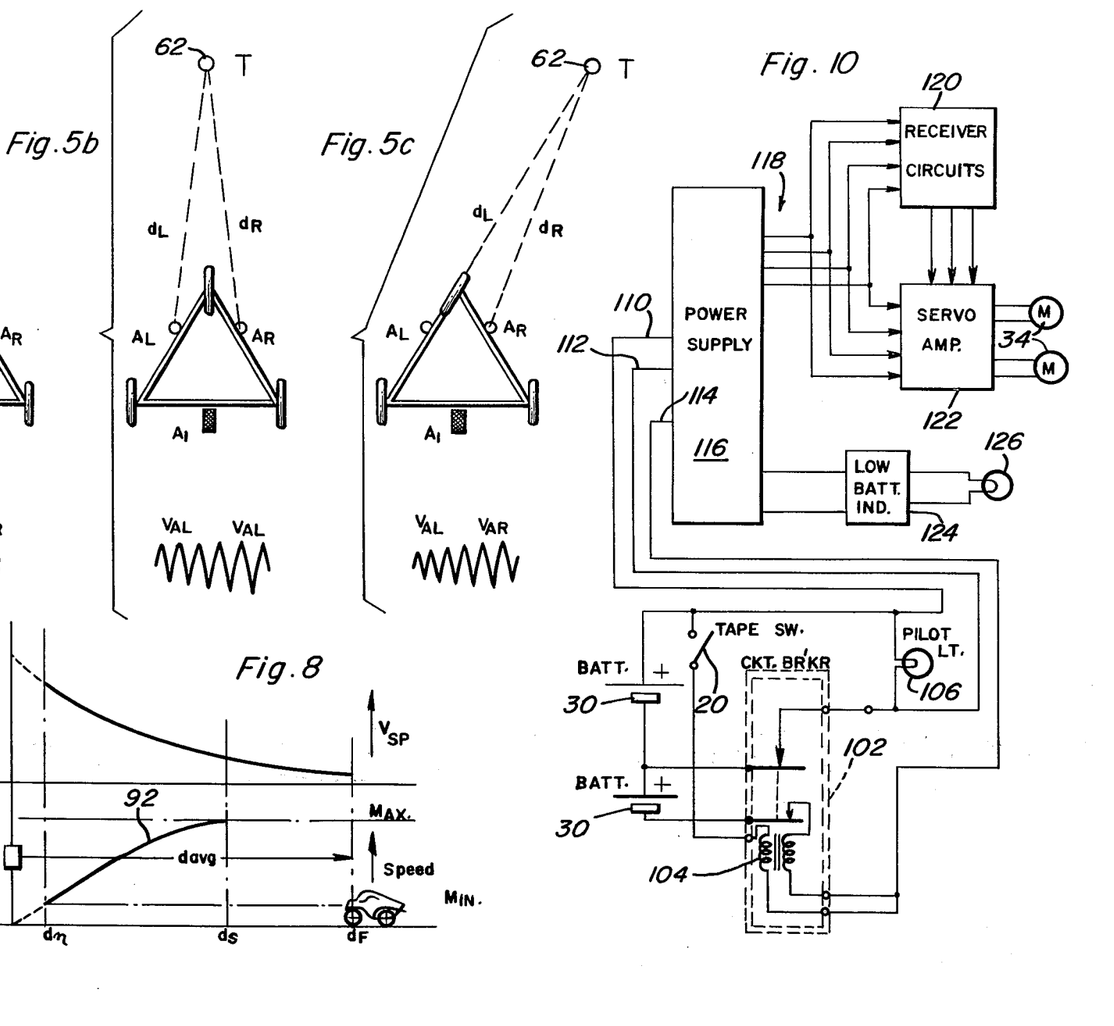
FIG. 8 is a diagrammatical and graphical illustration of the vehicle speed as a function of its distance from the transmitter.
FIG. 10 is a simplified, schematic block diagram of the vehicle's electrical system.

Referring now to FIGS. 5a, 5b, and 5c, it will be noted that receiving antennas 66 and 68 are separated by distance S, such that their individual voltages may differ depending upon transmitter location. The voltages induced in the right and left antenna $A_R$ and $A_L$ are inversely proportional to the distances $d_R$ and $d_L$, respectively, to the transmitter 62. The relationship of antenna voltages $V_{AR}$ and $V_{AL}$ to representative locations of the transmitter are shown below each of the illustrations. It can be seen that when the transmitter is to the left of the vehicle, $V_{AL}$ is greater than $V_{AR}$. Similarly, when the transmitter is to the right of the vehicle, the value of $V_{AR}$ exceeds that of $V_{AL}$. With the transmitter located directly ahead of the vehicle, the voltages induced in each receiving antenna will be approximately the same. For each location of the transmitter to the front of the vehicle, there is a corresponding location to the rear which will yield identical antenna voltages.

The vehicle electronic control system is provided with means for controlling both steering and speed functions. The receiving antenna voltages $V_{AR}$ and $V_{AL}$ are sufficient signals to provide such control. Within the control system, three mathematical operations are performed upon receiving antenna voltages $V_{AR}$ and $V_{AL}$. A speed voltage $V_{SP}$ is provided which is equal to the average of $V_{AL}$ and $V_{AR}$ and which corresponds to the average distance $d_{avg}$ and which is used for acceleration, deceleration, and constant speed functions. This voltage may be represented as follows:

$$V_{SP} = \frac{V_{AL} + V_{AR}}{2}$$

The control system also utilizes a steering voltage $V_{ST}$ which slows one wheel when positive and increases the speed of that wheel when negative. This formula may be represented by the following equation:

$$V_{ST} = V_{AL} - V_{AR}$$

A second steering voltage $\overline{V_{ST}}$ is provided to slo the other of the drive wheels when positive and increase the speed thereof when negative. This voltage may be represented by the equation:

$$\overline{V_{ST}} = V_{AL} - V_{AR}$$

These voltages are utilized to control the speeds of motors 33 and 34 of the dual drive mechanism, and thus, the speed and steering of movements of the vehicle. It will be appreciated that when the transmitter is directly ahead of the vehicle, as shown in FIG. 5b, $V_{AR} = V_{AL}$, and thus, $V_{ST} = 0$. Likewise, under this condition, $\overline{V_{ST}} = 0$. This is to be expected since the vehicle is headed directly toward the transmitter and it is not necessary to provide steering corrections to the right or left. Also, under this special situation, $$V_{SP} = \frac{V_{AL} + V_{AR}}{2} = V_{SP1}.$$

Since no steering voltages are present when the transmitter is directly in front of the vehicle, the drive wheels will rotate at a speed determined by $V_{SP1}$, and the vehicle will move in a straight course. The relationship of $d_{avg}$ and the speed of the vehicle is shown by the curve of FIG. 8. For $d_s < d_{avg} < d_F$ the vehicle will move forward at a maximum rate determined by the electronic control until $d_{avg}$ is reduced to $d_s$. As $d_{avg}$ is further reduced by the forward motion of the vehicle toward the transmitter, $V_{SP}$ increases rapidly, and both drive motors are slowed down sufficiently, as indicated by curve 92 of FIG. 8. This nearly inverse relationship between $V_{SP}$ and the speed of the vehicle continues until the vehicle reaches the Near boundary at distance $d_N$ and comes to a stop. As the golfer and transmitter move away along the center line, $d_{avg}$ becomes greater than $d_N$, $V_{SP}$ decreases and the vehicle accelerates forward and follows at the golfer's speed. It is the sloped portion of curve 92 which makes such speed regulation possible. Should the golfer move at a higher rate of speed, $d_{avg}$ will increase and the $V_{sp}$ will decrease such that the speed of the vehicle is increased to match that of the golfer.

When the transmitter is located to the left of the vehicle, as shown in FIG. 5a:

$$V_{SP} = \frac{V_{AL} + V_{AR}}{2} = V_{SP2}$$

$$V_{ST} = V_{AR} - V_{AL} = - V_{ST2}$$

and $$\overline{V_{ST}} = V_{AL} - V_{AR} = + V_{ST2}$$

since $$V_{AL} > V_{AR}.$$

Although the average forward speed of the vehicle is determined by $V_{SP}$ according to curve 92, the steer voltages ultimately change the speeds of each drive wheel. Since a negative $V_{ST}$ increases the speed of one wheel, and a positive $\overline{V_{ST}}$ decreases the speed of the other wheel, the vehicle is forced to turn toward the left until $d_R = d_L$ and $V_{AR} = V_{AL}$. This is achieved while maintaining the same average speed toward the transmitter. Thus, it will be appreciated that the vehicle will steer toward the transmitter which is located anywhere within the active area of the sensitivity pattern.

It will be appreciated that if the transmitter is located somewhat to the rear of the vehicle, yet still within the active area of the sensitivity pattern, the antenna voltages $V_{AR}$ and $V_{AL}$ will likewise differ such that the vehicle will execute the proper turn to the right or to the left in the same manner as described above. Thus, the antenna system geometry is such as to provide proper steering signals for the vehcile regardless of transmitter location within the active sensitivity pattern.

Figure 11:
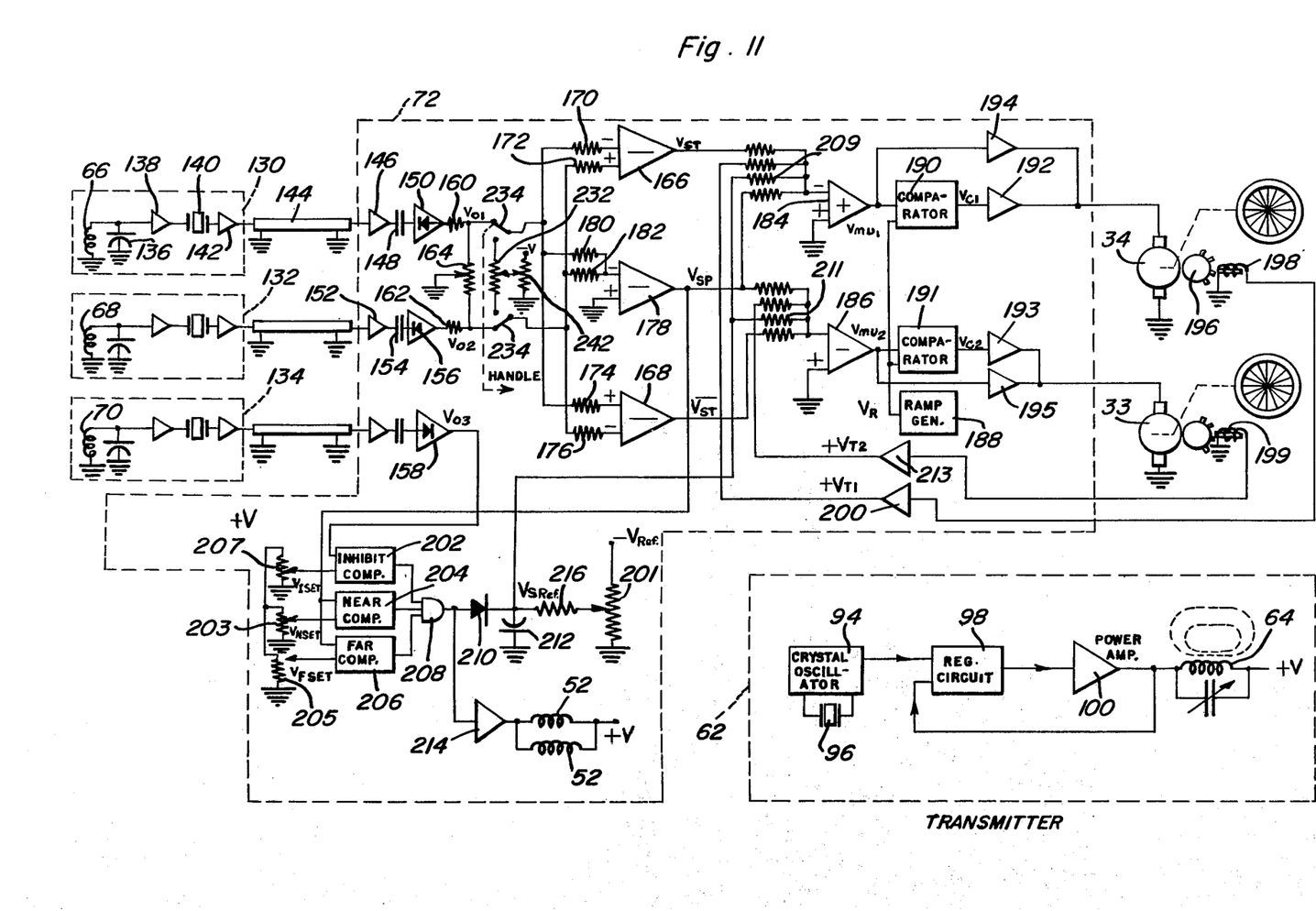
FIG. 11 is a block diagram of the complete control system associated with the present invention.

Since many vehicles may be used on a golf course at the same time and receiving and transmitting apparatus of each vehicle could become confused with each other, a highly selective channeling technique is provided to avoid such confusion. Each transmitter generates an alternating magnetiic flux field of predetermined strength and frequency. Preferaby, the transmitters are operated within a frequency range of 100 KHZ to 490 KHZ with a total of 40 independent channels within the frequency range. The basic transmitter circuitry is shown in FIG. 11 wherein an oscillator 94 is provided which generates an output signal at a resonate frequency $f_o$ of crystal 96. This signal is fed into a regulator circuit 98 which drives a power amplifier 100 to inject a pulse current into the transmitting antenna coil 64 resonated at the crystal frequency $f_o$. The output of power amplifier 100 is also fed back to the regulator circuit to provide a substantially constant output regardless of battery condition. This assures that the magnetic flux and thus the voltage signals induced into the receiving antennas will remain constant regardless of battery condition.

Referring now to FIG. 10, the basic circuitry of the vehicle electrical package may be more fully appreciated. A source of voltage is provided by a pair of batteries 30 which are serially connected to each other for delivery of power through a circuit breaker 102 including a solenoid 104. A tape switch 20 which is mounted on the front edge of the vehicle is connected in parallel with the batteries through solenoid 104, such that its closure upon collision will energize solenoid 104 to trip the circuit breaker and deenergize the vehicle. A pilot light 106 is provided to indicate when the vehicle system is energized through circuit breaker 102. Leads 110, 112, and 114 provide a source of low and high voltage leading into a power supply 116. Output lines 118 provide power to receiver circuits 120 and servo amplifier 122 to energize and control motors 33 and 34. A low battery indicating circuit 124 may be provided to indicate when the batteries should be charged, such indication being visible by way of indicating lamp 126.

A more detailed understanding of the electric package circuitry may be had by referring to FIG. 11. Receiving antennas 66 and 68 and inhibit antenna 70 are all incorporated into identical receiver circuits 130, 132, and 134, respectively, since the operaton of each receiver is identical, a description of one will likewise apply to the others. Receiver 130 is provided with an antenna 66 which resonates with tuning capacitor 136 at the frequency $f_o$ of the transmitter crystal. The voltages induced in antenna 66 are fed into buffer amplifier 138 which prevents crystal filter 140 from loading the antenna coil. Crystal filter 140 passes only signals of frequency $f_o$ through to amplifier 142 connecting the receiver 130 to the main electronic package 72 by way of shielded cable 144.

Inside the main electronic package, the signal from receiver 130 is amplified at 146 and coupled through capacitor 148 to the input of an active rectifier 150, where it is converted from an ac signal into a negative dc voltage $V_{01}$ proportional to the amplitude of the ac signal. Signals from receiver 132 are similarly processed through elements 152, 154, and 156 to provide a negative dc voltage $V_{02}$. The signals from receiver 134 are processed in a like manner, but provide a positive dc voltage $V_{03}$ from rectifier 158.

Resistors 160 and 162 with potentiometer 164 form a voltage divider across the outputs of active rectifiers 150 and 156. Slight differences in gain between the processing of voltages $V_{01}$ and $V_{02}$ from antennas 66 and 68 may be adjusted to zero by adjustment of potentiometer 164.

Differential amplifiers 166 and 168 are connected to voltages $V_{01}$ and $V_{02}$ through input resistors 170, 172, 174, and 176. The inverting and noninverting inputs of these amplifiers are interchanged from amplifiers correspond to amplifier 168. The outputs of these amplifiers correspond to the steering voltages $V_{ST}$ and $\overline{V_{ST}}$. These voltages may be expressed mathematically by the following equations:

$$V_{ST} = V_{01} - V_{02} = V_{AR} - V_{AL}$$

$$\overline{V_{ST}} = V_{02} - V_{01} = V_{AL} - V_{AR}.$$

A summation amplifier 178 is provided with voltages $V_{01}$ and $V_{02}$ through input resistors 180 and 182. Summing amplifier 178 provides an output voltage $V_{SP}$ for speed control and which may be expressed by the following equation:

$$V_{SP} = \frac{V_{01} + V_{02}}{2} \approx \frac{V_{AR} + V_{AL}}{2}.$$

The speeds of the drive motors are controlled by summing amplifiers 184 and 186 which develop output voltages $V_{MU1}$ and $V_{MU2}$, each of which is a summation of four input voltages which may be expressed as follows:

$$V_{MU1} = -K(V_{Sref} + V_{SP} + V_{ST} + V_{T1})$$

$$V_{MU2} = -K(V_{Sref} + V_{SP} + \overline{V_{ST}} + V_{T2})$$

where:
$V_{MU1}$ = motor 34 utilization voltage, postive for motor action negative for dynamic brake action
$V_{MU2}$ = motor 33 utilization voltage, positive for motor action negative for dynamic brake action
$V_{Sref}$ = a negative reference voltage that biases the summing amplifier outputs for maximum motor speeds.
$V_{SP} = V_{01} + V_{02}/2$ acts to reduce motor speeds
$V_{ST} = V_{01} + V_{02}$ decreases speed of motor 34 when positive increases speed of motor 34 when negative
$\overline{V_{ST}} = V_{02} - V_{01}$ decreases speed of motor 33 when positive increases speed of motor 33 when negative
$V_{T1}$ = a positive voltage proportional to the speed of motor 33
$V_{T2}$ = a positive voltage proportional to the speed of motor 34
$-K$ = gain constant of summing amplifier.

The drive circuitry for motors 33 and 34 will now be explained in more detail. The output voltage of summing amplifier 184 is continuously compared with a positive linear ramp voltage $V_R$ generated in the ramp generator 188 by comparator circuit 190. The output voltage $V_{C1}$ of comparator 190 has only two states which are determined by the inputs $V_R$ and $V_{MU1}$ such that:

if $V_{MU1} > +V_R$ then $V_{C1} = +V_{state}$
if $V_{MU1} < +V_R$ then $V_{C1} = -V_{state}$.

The result is that $V_{C1}$ is a pulse train at the repetitive rate of the ramp generator 188, with a duty cycle determined by the magnitude of $V_{MU1}$. For $+V_{MU1} = 0$ the duty cycle would be zero and $V_{C1}$ would remain in the $-V_{state}$. Motor drive amplifier 192 amplifies the output voltage $v_{C1}$ and provides a large current to motor 34. The current flows only when $V_{C1}$ is at $+V_{state}$, and thus, the motor is driven by a train of pulses of variable duty cycle. It is a property of direct current motors to average these current pulses and operate at a speed proportional to the duty cycle. Thus, to vary the speed of motor 34, $V_{MU1}$ must also vary. Should the output voltage of summing amplifier 184 become negative, the duty cycle would be zero, and no current would be delivered to motor 34. Dynamic brake amplifier 194 is operative when $V_{MU1} < 0$ and provides an electronic load to motor 34. The degree of loading placed upon motor 34 depends upon the magnitude of $-V_{MU1}$ and the speed of motor 34. The relationship is such that motor 34 drives its wheel when amplifier 192 is in use and retards or brakes its wheel when amplifier 194 is in use.

The rotational speed of motor 34 is measured through the employment of a ferromagnetic gear 196, carrying straight cut teeth of a known number and a magnetic sensor 198. The gear rotates with the shaft of motor 34, and the sensor 198 is positioned to produce a voltage output pulse for each tooth of the gear 196 dependent upon motor rotation. These voltage pulses are amplified and standardized in tachometer amplifier 200 which yields an output voltage $+V_{T1}$ which is proportional to the speed of motor 34.

Since it is desired that the vehicle operate at some maximum speed when $d_{avg}$ of curve 92 in FIG. 8 is between $d_F$ and $d_S$, and $V_{SP}$ is of a small magnitude, some means for biasing the summing amplifiers 184 and 186 to give a $V_{MU1}$ and $V_{MU2}$ corresponding to that maximum vehicle speed is provided. This is achieved through potentiometer 201 connected to $-V_{ref}$, a negative reference supply, to ground and to resistor 216 to provide a voltage $V_{Sref}$ across capacitor 212 which is applied through resistors 209 and 211 to the summing amplifiers 184 and 186, respectively.

In the absence of $V_{SP}$ and $V_{ST}$, from the equation $V_{MU1} = -K(V_{Sref} + V_{SP} + V_{ST} + V_{T1})$, it is apparent that $V_{MU1}$ and the duty cycle is dependent upon the speed reference voltage $V_{Sref}$ and tachometer voltage $V_{T1}$. Should an external load tend to slow motor 34, the tachometer voltage $V_T$ would decrease tending to increase $V_{MU1}$ and the duty cycle of motor 34, thus increasing its torque. This increase in torque operates to return the wheel to its original unloaded speed. This difference between the unloaded speed and the loaded speed is mainly determined by the gain constant $-K$ of summing amplifier 184. The constant speed characteristics of motor 34 is maintained for values of $V_{MU1}$ positive or negative. Thus, the constant speed characteristic is provided for both motor action and dynamic braking action.

The voltage output $V_{MU1}$ of summing amplifier 184 as it affects motor and braking utilization is graphically illustrated in FIG. 9. The circuitry of summing amplifiers 184 and 186 plaaces no constraint upon the polarity or magnitude of $V_{MU1}$ relative to $V_{MU2}$. Therefore, it is possible for one motor to be driven while the other motor is in the dynamic braking mode.

The start and stop functions of the motor are controlled by three comparators 202, 204, and 206. Voltage $V_{SP}$ which is inversely related to $d_{avg}$, as shown in FIG. 8, is continuously compared against two voltages, $V_{Nset}$ and $V_{Fset}$ which are of the same magnitude as $V_{SP}$ at $d_N$ and $d_F$. Comparator 204 drives gate 208 whenever $V_{SP} > V_{Nset}$. Gate 208, when driven, produces a positive output current which flows through diode 210 and discharges capacitor 212. This removes the $V_{Sref}$ voltage from the inputs to summing amplifiers 184 and 186, which stops any motor action and actuates electric parking brakes through amplifier 214. This condition will exist as the golfer approaches the vehicle to a position closer than $d_N$ or when the vehicle approaches the golfer to place the transmitter with $d_N$. Similarly, since $V_{SP} > V_{Fset}$ at $d_F$, comparator 206 drives gate 208 to stop the motors and to apply the parking brakes.

Comparator 202 continuously compares $V_{o3}$, a dc voltage proportional to the coupling of transmitter 62 with inhibit antenna 70, against voltage $V_{Iset}$ and drives gate 208 whenever $V_{o3} > V_{Iset}$. Voltage $V_{o3}$ will exceed $V_{Iset}$ at distances $d_{IF}$ and $d_{IR}$, giving rise to curve 82 shown in FIG. 6c.

Should the golfer move the transmitter to a location inside the sensitivity pattern boundary, comparators 202, 204, and 206 will cease to drive gate 208, which will, in turn, allow amplifier 214 to deenergize the parking brakes 52 and diode 210 to block. As the voltage exponetially rises across capacitor 212 from zero towards $V_{Sref}$, the values of $V_{MU1}$ and $V_{MU2}$ are increased in the positive direction, yielding motor drive action. The time required for capacitor 212 to charge is determined by the RC time constant of the capacitor and resistor 216. This time delayed application of $V_{Sref}$ is necessary to prevent rapid acceleration of the drive motors upon energization.

In addition to the automatic control provided through the antenna system, the vehicle is provided with a manual control, shown in FIGS. 12 and 13. A retractable handle mechanism generally indicated by the numeral 220 permits the golfer to selectively manually operate the vehicle when he desires the vehicle to follow immediately behind him, such as when crossing narrow bridges and the like. When in the fully extended position, the handle mechanism is coupled to the electronic system to provide the necessary forward speed. Lateral movement of the handle mechanism develops electrical steering signals which cause the vehicle to follow the golfer. The handle mechanism is retractably mounted to the vehicle body 16 and includes a control arm 222, preferably with a gripping nob 224 at its end. The control arm is slidably received by an open ended bushing 226 extending through a mounting block 228. Block 228 is pivotally mounted to the vehicle body by appropriate means including a centering spring 230 which is effective to return the control arm to the center position when left unattended by the golfer. Block 228 is also operatively connected to a steering potentiometer 232, such that lateral movement of the control arm affects movement of the potentiometer. A manual control switch 234 is positioned within the vehicle and includes an operating lever 236 which is adapted to engage a cam surface 238 affixed to the end of the control arm 222. A coil spring 240 extends between mounting block 228 and biases the cam surface 238 away from switch lever 236. Switch 234 includes two sets of contacts which are effective to disconnect receiving antennas 66 and 68 from the electronic system such that voltages $V_{o2}$ and $V_{o1}$ are not fed to summation amplifiers 166 and 168 or to differential amplifier 178.

Potentiometer 232 acts as a voltage divider for the negative voltage supplied through adjustment potentiometer 242, as shown in FIG. 11. As such, the relative magnitudes of the voltages fed to amplifiers 166, 168 and 178 are controlled through and determined by the lateral position of control arm 222. The operation of the manual control handle mechanism may be explained as follows. As the golfer grasps the nob 224 and pulls the control arm 222 forward, cam 238 engages switch lever 236 which in turn disconnects the antenna receivers 130 and 132 from the electronic system to provide steering voltages through potentiometer 232. When the control arm is in the potentiometer are of equal magnitude, and, as such, are both drive motors 33 and 34 are driven at the same rate. This causes the vehicle to move forward along a straight course. If the golfer desires to walk to the right or to the left, such will result in a corresponding lateral movement of control arm 222 which, in turn, changes the relative magnitudes of the steering voltages through the potentiometer which steer the cart to follow the golfer's movements to the right or left. Should the golfer release nob 224, coil spring 240 will move control arm 222 in the backward direction such that cam surface 238 disengages switch lever 236. Upon deactuation of switch 234, the vehicle is returned to the transmitter control mode.

Summarizing operation of the control system of the present invention, the transmitter carried by the golfer establishes a magnetic energy field by means of which its voltage regulated transmitter coil antenna 64 provides distance information picked up by the three receiving antennas 66, 68, and 70 mounted in fixed spaced relationship in the vehicle. The three antennas establish signals by means of receivers 130, 132, and 134 to provide signal voltages which are inverse functions of the distance between the receiving antennas and the transmitter antenna. The signal voltages associated with two of the receivers are balanced through potentiometer 164 for equalizing gain in order to provide both speed and steering information by applying the receiver outputs to a pair of differential amplifiers 166 and 168 and to summing amplifier 178.

Turn signals are obtained from the differential amplifiers to define the orientation of the vehicle relative to the transmitter. The summing amplifier output furnishes information as to the distance between the transmitter and the vehicle. The speed signal information obtained from the summing amplifier 178 is fed to a pair of comparison circuits 204 and 206 by means of which the limits of the transmitter signal range are established in order to stop movement of the vehicle at predetermined distances from the golfer. The outputs of these comparison circuits are passed through an OR gate 208 to a parking brake mechanism for static braking of the vehicle when the vehicle arrives at the aforementioned boundries. The Near and Far boundary limits may be set by adjusting voltages $V_{Nset}$ and $V_{Fset}$ through potentiometers 203 and 205, respectively. Also, the signal level output may be adjusted through potentiometer 207 for operation of the parking brake through gate 208 to prevent ambiguous signal conditions when the transmitter is within the Inhibit boundary.

The outputs of comparators 202, 204, and 296 are fed into OR gate 208 which activates the static parking brake when its output is in the positive mode. The output of inhibit comparator 202 will be positive if voltage $V_{03} > V_{Iset}$. Similarly, the output of Near comparators 204 will be positive when $V_{sp} > V_{Nset}$. The Far comparator 206 output will be positive when $V_{SP} < V_{Fset}$. The relationship between the sensitivity pattern, receiving and inhibit antennas, and the comparator circuit is such that the vehicle will be motorized only when the transmitter is within the active area of the sensitivity pattern. A typical operation provided by this arrangement may be understood by referring to the curves illustrated in FIGS. 6b and 6c. The voltage curves 78 and 82 are representative of the voltages induced in the receiving and inhibit antennas, respectively, as the transmitter is moved from a Far position directly in front of the vehicle in a path which moves above the vehicle to a remote position directly to the vehicle's rear. When the transmitter is located at some distance $d_4$ beyond the Far boundary $d_F$, the output of Far comparator, $v_{SP} < V_{Fset}$ and the output of the Far comparator will be positive, thus driving gate 208 to actuate the static brake system. However, as the transmitter moves to some distance $d_1$ within the Far boundary $d_F$, the $V_{SP}$ will be greater than $V_{Fset}$ and the Far comparator output will be negative. Also, since $V_{03} < V_{Iset}$ and $V_{SP} < V_{Nset}$, the outputs of the inhibiter and Near comparators will each be negative, such that OR gate 208 is not driven and the brake system is not actuated. As the transmitter passes through the receiving antenna null region between $d_2$ and $d_3$, the inhibit antenna of voltage is sufficient to provide positive output from the inhibiter comparator to actuate the brake system. Similarly, as the transmitter passes through the inhibit null region, the voltage from receiving antennas 66 and 68 is sufficient to provide positive output from the Far comparator to drive the OR gate 208. Operation of the static brake system at other transmitter locations can be understood by referring to the table below.

| T Position | TRANSMITTER POSITION GATE MODE TABLE | | | |
|---|---|---|---|---|
| | Far | Near | Inhibit | OR Gate |
| Beyond $d_F$ | + | − | − | + |
| Within $d_F(d_1)$ | − | − | − | − |
| Within $d_N$ | − | + | − | + |
| Within $d_{IF}$ | − | + | + | + |
| At $d_{02}$ | − | + | + | + |
| Between $d_2$ and $d_3$ | + | − | + | + |
| Within Inhibit Null Region | + | − | − | + |
| Immediately Behind Vehicle | + or − | − | + | + |
| Beyond $d_{IR}$ | + | − | + | + |

The comparator circuits through which the limits are established for the vehicle movement zone have an adjusted amount of hysterisis in order to restart the vehicle from a different location at which it was stopped when approaching a boundary.

When a positive stop signal is established through gate 208, it is applied to summing amplifiers 184 and 186 in order to affect dynamic braking of the vehicle by operation of the drive motors in the generator mode. Thus, the vehicle is decelerated until the stop signal level reaches a value at which the static parking brakes are applied. The summing amplifiers 184 and 186 are also supplied with turn and speed control signal information, as well as vehicle speed information derived from the tachometer sensors 198 and 199 to vary motor utilization as a function of distance between the vehicle and the transmitter. Any tendency of the vehicle to change speed due to change in terrain, such as uphill or downhill conditions, will be compensated for through the tachometer sensors and tachometer amplifiers 200 and 207. In extreme downhill conditions, the tachometer voltages will be effective to operate the motor to the dynamic braking mode. Thus, the outputs of summing amplifiers 184 and 186 control propulsion of the vehicle at varying speeds in accordance with desired characteristics, control steering and turning of the vehicle, as well as deceleration. The motor drive amplifiers 192 and 193, together with dynamic braking amplifiers 194 and 195 drive or load each motor winding for operation thereof, either as motors for vehicle propelling and steering purposes, or as generator for dynamic braking purposes as well as steering purposes.

Separate frequency channels assure against erroneous control of the vehicle by signals from the wrong transmitter located within the sensitivity pattern. Tape swich 20 provides a means of automatic emergency shut-off should the vehicle contact an obstacle within its path of travel. The transmitter is provided with a regulated voltage supply to insure a constant magnetic field strength within tolerable limits, thus guaranteeing proper vehicle response from the induced receiving antenna voltages. The transmitter is extremely compact and light weight, such that it may be easily carried by a golfer without interference with the golfer's swing or other movements. Also, the transmitter is provided with an on-off switch which permits the golfer to easily stop the vehicle for play around golfing greens, and the like. The manual control handle mechanism permits a golfer to steer the vehicle manually for control in close quarters, or in the event that the transmitter or receiver circuits should fail.

From the foregoing, it is apparent that the self-propelled vehicle of the present invention is highly versatile and extremely efficient, yet relatively simple in over-all construction and relatively inexpensive to manufacture. The magnetic coupling concept, electronic control, and manual control handle mechanism may be used in applications other than caddying vehicles. Such applications, however, are deemd to fall within the scope of the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an energy field, a control system comprising a plurality of antenna devices located within said energy field, separate receiver means respectively connected to said antenna devices for developing signal voltages at levels depending on the positions of the antenna devices within the energy field, means connected to at least two of the receiver means for producing direction control signals in response to differences in energy levels between the signal voltages, means connected to at least one of the receiver means for producing speed control signals reflecting the positions of the antenna devices within the energy field, a pair of servo operating devices, and pulse developing means connected to said servo operated devices for converting the direction control and speed control signals into drive pulses of one polarity supplied to the servo operating devices.

2. The combination of claim 1 wherein said pulse developing means includes ramp generator means.

3. The combination of claim 2 including summation amplifier means for processing said speed and direction control signals, the output signas from said summation amplifier means being fed to said pulse developing means.

4. The combination of claim 3 wherein said pulse developing means includes comparator means for comparing said ramp generator means signals with said output signals.

5. A magnetic coupling system for guiding a motorized vehicle, said system comprising transmitter means adapted to be moved over the ground for generating a magnetic field comprised of a plurality of magnetic flux lines of predetermined shape and direction, the strength of said magnetic field being substantially inversely proportional to the distance from said transmitter means, a receiving antenna system mounted in a vehicle adapted to be moved over the ground, said antenna system including directional receiving antenna means and inhibit antenna means, each having orientations of maximum and minimum sensitivity relative to said magnetic flux lines, said receiving and inhibit antenna means providing induced signal voltages each substantially inversely proportional to the distances from said transmitter means for substantially the same orientation relative to said magnetic flux lines, said inhibit antenna means being oriented to provide induced signal voltages greater than a predetermined inhibit voltage when within a predetermined inhibit area surrounding said transmitter means except for a small inhibit null region falling within said predetermined inhibit area, said receiving antenna means providing voltages induced by said magnetic flux lines of greater magnitude than a predetermined boundry voltage when within a predetermined boundry area surrounding said transmitter means except for relatively small receiver null regions within said boundry area, said receiving antenna voltage being less than said predetermined boundry voltage when said inhibit antenna voltage is below said predetermined inhibit voltage due to said inhibit antenna means being located in said inhibit null region.

6. The system set forth in claim 5 wherein said receiving antenna means includes at least one receiving antenna having a receiving axis adapted to provide a stronger induced voltage when said magnetic flux lines intersect the receiving antenna at an angle generally parallel to said receiving axis and to provide a negligible induced voltage when said magnetic lines of flux intersect perpendicular to said receiving antenna axis, and said inhibit antenna means including an inhibit antenna similar to said receiving antenna and having its receiving axis lying in a plane which is at an angle to said receiving antenna axis.

7. The system set forth in claim 6 wherein said receiving antenna means includes a pair of said receiving antennas in fixed spacial relationship to each other and having receiving axes substantially parallel to each other.

8. The system set forth in claim 7 wherein said transmission means generates a plurality of magnetic flux lines which extend in generally circular paths in space to define a magnetic flux pattern for coupling with said receiving and inhibit antenna means.

9. The system set forth in claim 8 wherein said transmission means includes a transmitting antenna adapted to be moved at a substantially constant height above the ground with a transmission axis in a substantially vertical orientation and through which said magnetic flux pattern is generated.

10. The system set forth in claim 9 wherein said receiving antenna axes are oriented in the vehicle at a slight angle to the vertical and at a substantially constant height above the ground.

11. The system set forth in claim 10 wherein said inhibit antenna is spaced from said receiving antennas and is oriented in the vehicle with its axis in a plane substantially perpendicular to the axes of said receiving antennas.

12. The system set forth in claim 11 wherein said antenna system provides an inhibit area directly behind the vehicle, the voltages induced when said transmission means antenna located within said inhibit area providing predetermined signals which stop the vehicle.

13. The system set forth in claim 12 wherein said receiving and inhibit antennas each include a helical coil wound about their respective receiving axes.

14. The system set forth in claim 13 wherein the top axial ends of each of said pair of receiving antennas is inclined from the vertical toward said inhibit antenna.

15. The system set forth in claim 14 wherein said receiving and inhibit antennas each include an air core which provides substantial magnetic coupling with said magnetic flux pattern.

16. A directional antenna assembly for remote control vehicles responsive to a control signal generated at a mobile remote location, said assembly including a pair of spaced receiving antennas mounted to the vehicle for independently receiving said control signal at energy levels substantially inversely proportional to the distance to the remote location to provide speed and steering control for the vehicle and having sensitivity receiving axes substantially parallel to each other, and an inhibit antenna coupled with said pair of antennas in a non-ambiguous manner and mounted to the vehicle in spaced relation to said pair of receiving antennas and having a sensitivity receiving axis in a plane substantially perpendicular to the receiving axes of said receiving antennas for preventing ambiguous coupling of said pair of antennas and provide a sensitivity pattern having a portion rearwardly of the vehicle in which the vehicle is not responsive to the control signal.

17. The assembly set forth in claim 16 wherein each of said receiving antennas is inclined slightly from the vertical in a general direction toward said inhibit antenna.

18. The assembly set forth in claim 16 wherein each of said antennas includes a helical coil extending around its receiving axis to provide a predetermined magnetic flux sensitivity pattern.

19. The assembly set forth in claim 16 wherein said inhibit antenna axis is inclined slightly downwardly from the horizontal and generally pointed toward the rear of the vehicle to provide an inhibit sensitivity pattern in the area directly behind the vehicle.

20. The assembly set forth in claim 19 wherein said antennas define a sensitivity area having a far boundary and a near boundary with the control signal maintaining the vehicle in predetermined relation to the control signal when located between said boundaries and stopping the vehicle when the control signal moves out of the sensitivity area between said boundaries.

* * * * *